Patented Dec. 26, 1922.

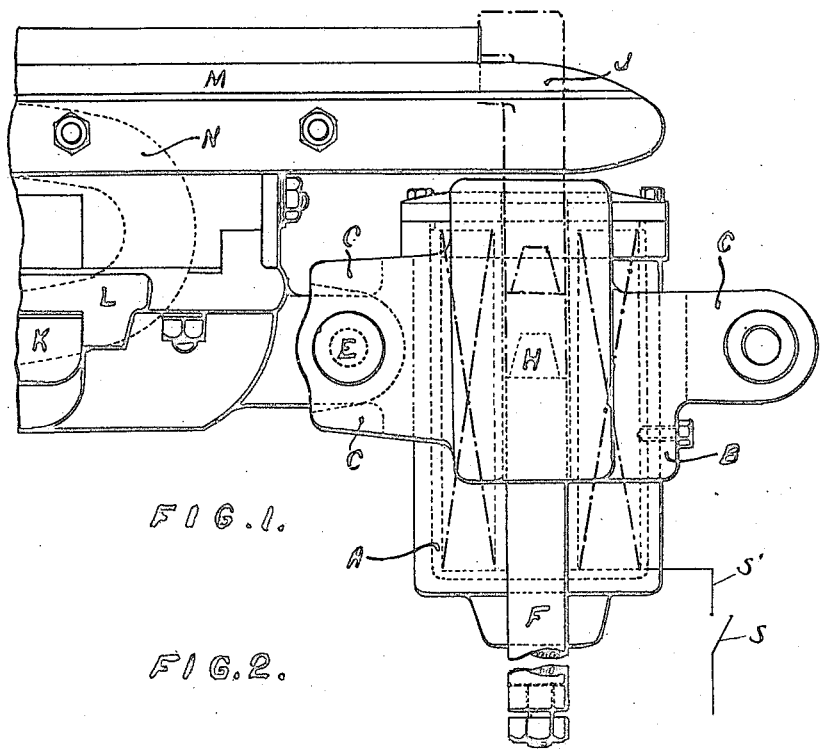
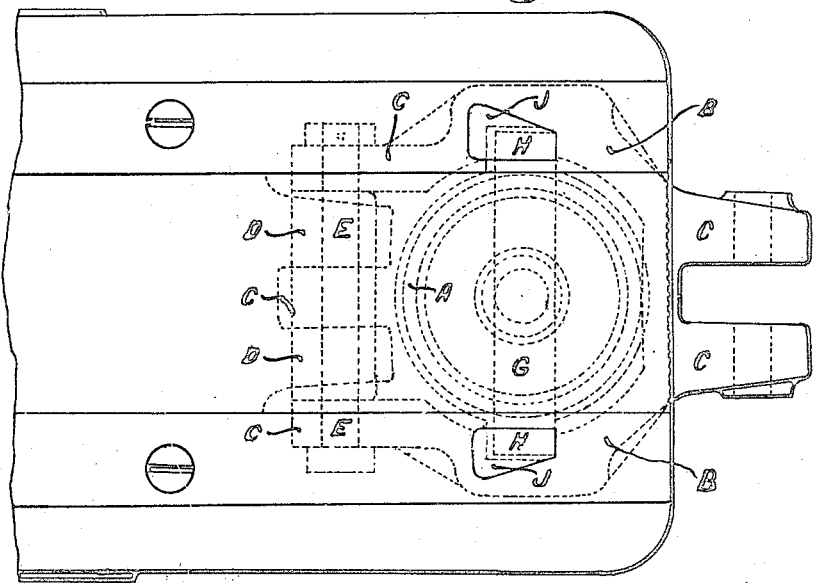

1,440,222

UNITED STATES PATENT OFFICE.

JOSEPH JEFFREY INGLIS, OF MOTHERWELL, SCOTLAND.

ELECTROMAGNETICALLY-OPERATED PLATE OR BAR HANDLING SKID FOR ROLLING MILLS.

Application filed May 17, 1921. Serial No. 470,462.

*To all whom it may concern:*

Be it known that I, JOSEPH JEFFREY INGLIS, a subject of the King of Great Britain and Ireland, and a resident of Motherwell, in the county of Lanark, Scotland, have invented certain new and useful Improvements in Electromagnetically-Operated Plate or Bar Handling Skids for Rolling Mills, of which the following is the specification.

The invention relates to skids for handling plates and bars in connection with rolling mills and of the kind in which there is a plate-receiving table of magnetic material upon which the plate is held electromagnetically, the table being supported on skids or runners sliding upon rails upon which the whole is supported.

The invention has for its object to provide simple and effective means for retaining the plate upon the table and for preventing its displacement off the magnet when the plate is too hot to be magnetic, and has further for its object to provide improved means for lessening friction between the skids and the rails.

According to the invention there is provided at the end or ends of the skid table one or more vertically-movable detent plungers operatively connected to solenoids and controlled by weights or springs, so that they may be caused to project above the table into the path of the plate, or may be withdrawn clear of it.

In order that the windings of the solenoids operating these plungers—and which they may operate either directly or indirectly but preferably directly—may not be affected by the magnetic field of the main plate holding table magnets, they are carried from the table on supports of non-magnetic material, or which are magnetically insulated.

It will be understood that the skid table is, in general, of the type common in plate mills, and is capable of being drawn along on rails. These tables receive the plates from one of a train of live rollers in a plate mill (the rollers being what is sometimes known as the roller table, upon which the plate is delivered from the rolls of the mill) and convey them to another live roller table. According to the present invention, each sled, which consists of a heavy metal plate supported on runners, may have means for magnetizing the heavy plate or table so that the rolled plate delivered onto it is held down by the magnets. The detent device prevents the rolled plate, when delivered onto the sled, from sliding off the far end of the table.

Similarly, and in order to prevent undue friction between the skids proper and the rails, the skids are connected to the table by non-magnetic material, are magnetically insulated or are constructed of non-magnetic material.

Part of a skid table showing the application thereto of an example of the invention is shown on an accompanying sheet of drawings, Figure 1 being a side elevation and Figure 2 a plan.

In this example the solenoid coil A is supported in a cage B of non-magnetic material which has lugs C by which it is supported between lugs D on one table and similar lugs (not shown) on the next table on bolts E.

The solenoid plunger F is connected to a yoke G carrying two plungers H, guided in apertures in the table and having dog-pieces J at their upper ends which, engaging recesses in the upper face of the table so positioned that the upper surfaces of the dog pieces are below the surface of the table, support the weight of the whole. When the solenoid coil is energized, for example by the closing of the switch S in the solenoid circuit S', the yoke G and plungers H are raised, bringing the dog pieces into the path of the plate as indicated in dotted lines in Figure 1.

In order to prevent undue friction between the skids K and the rails on which they slide, the skids are supported from the table in brackets L of non-magnetic material.

The skid table M of magnetic material is energized by coils N in usual manner, but under some circumstances where a magnetized table is unnecessary the coils may be dispensed with.

What I claim is:—

1. In a skid table of the type described, a plate-supporting table, a movable detent normally below the supporting surface of the table, and electro-magnetic means for raising the detent to plate-obstructing position.

2. In a skid table of the type described, a plate-supporting table, a movable detent normally below the supporting surface of the table, and electro-magnetic means for raising the detent to plate-obstructing position, together with non-magnetic means for supporting the electro-magnet from the table.

3. In a skid table of the type described, a plate-supporting table, a movable detent piercing the same but supported therefrom below its plate-supporting surface, and electro-magnetic means for raising the detent to plate-obstructing position.

4. In a skid table of the type described, a plate-supporting table of magnetic material, skids therefor and non-magnetic means connecting the skids to the table.

5. In a skid table of the type described, a plate-supporting table of magnetic material, a magnetically operated detent movable to plate-obstructing position, skids on which the table is supported, and non-magnetic means connecting said skids and detent-operating electro-magnet to the table.

In testimony whereof I have signed my name to this specification.

JOSEPH JEFFREY INGLIS.